United States Patent [19]

Breslin

[11] Patent Number: 4,663,037

[45] Date of Patent: May 5, 1987

[54] APPARATUS FOR RECOVERY OF LIQUID HYDROCARBONS FROM GROUNDWATER

[76] Inventor: Michael K. Breslin, 1615 Vendola Dr., San Rafael, Calif. 94903

[21] Appl. No.: 657,350

[22] Filed: Oct. 3, 1984

[51] Int. Cl.⁴ ........................................... E02B 15/04
[52] U.S. Cl. ................................ 210/170; 210/242.1; 210/242.3; 210/923
[58] Field of Search ..................... 210/170, 923, 242.1, 210/86, 242.3

[56] References Cited

U.S. PATENT DOCUMENTS

| | | | |
|---|---|---|---|
| 291,285 | 1/1884 | Breese | 210/242.1 |
| 4,024,063 | 5/1977 | Mori | 210/242.1 |
| 4,038,182 | 7/1977 | Jenkins | 210/923 X |
| 4,142,972 | 3/1979 | Nebeker et al. | 210/242.1 X |
| 4,154,678 | 5/1979 | Kole | 210/242.1 X |
| 4,196,087 | 4/1980 | Gordon | 210/242.1 |
| 4,224,162 | 9/1980 | Ayroldi | 210/923 X |
| 4,243,529 | 1/1981 | Strauss | 210/923 X |
| 4,273,650 | 6/1981 | Solomon | 210/923 X |
| 4,405,458 | 9/1983 | McHugh, Jr. | 210/923 X |
| 4,469,170 | 9/1984 | Farmer, Jr. | 210/923 X |
| 4,582,609 | 4/1986 | Hunter, III et al. | 210/170 X |

FOREIGN PATENT DOCUMENTS

| | | | |
|---|---|---|---|
| 1353806 | 5/1974 | United Kingdom | 210/242.1 |
| 1594698 | 8/1981 | United Kingdom | 210/923 |

Primary Examiner—Richard L. Chiesa

[57] ABSTRACT

Apparatus for recovery of liquid hydrocarbons from on top of ground water in which a recovery unit is used which sinks in the liquid hydrocarbon and floats on water. The sinking of the recovery unit allows liquid hydrocarbons to enter the unit so that they can be pumped out of the unit to a holding tank. Members are provided to center the unit in a well casing and hold it in a vertical position; these members are also used as conduits to pass liquid hydrocarbons, air, and water.

12 Claims, 5 Drawing Figures

U.S. Patent   May 5, 1987   Sheet 3 of 3   4,663,037

APPARATUS FOR RECOVERY OF LIQUID HYDROCARBONS FROM GROUNDWATER

FIELD OF THE INVENTION

This invention relates to the recovery of liquid hydrocarbons (oils and gasoline) which reside underground on top of ground water. The liquid hydrocarbons are present in such a place usually because of an unintentional oil spill from a storage tank or other facility.

BACKGROUND OF THE INVENTION

Proposals have been made in the past to provide an underground oil spill recovery system installed in a well casing using a submersible pump and a fluid level sensor. The level sensor is of such construction as to discern between oil and water. The submersible pump is turned on when the sensor registers a sufficient depth of oil below the pump. The pump and sensor are secured at fixed locations in the well. Their positions do not change as the oil and water levels in the well rise and fall. This system requires a 6 to 8 inch inside diameter well casing. Such an oil recovery system is disclosed in U.S. Pat. No. 4,273,650 to Solomon, issued June 16, 1981.

Another underground oil spill recovery system is currently being sold by Oil Recovery Systems of Greenville, N.H. The system uses a floating oil recovery unit comprised of a receptacle for the oil and a semipermeable membrane on the periphery of the receptacle. The membrane allows only liquid hydrocarbons to pass through it and prevents the passage of water. The membrane is submerged about 1/4 inch into the water so that all hydrocarbons on the water will contact the membrane. As the receptacle is filled by the hydrocarbons, which passed through the membrane, a float inside the receptacle rises and triggers a pump which empties the receptacle of the liquid hydrocarbons. This system depends upon the semipermeable membrane to separate the oil from the water. This system usually requires a 24-inch diameter well casing. Such an oil recovery system is disclosed in U.S. Pat. No. 4,243,529 to Strauss, issued June 15, 1979.

Another device for removing floating material from water uses a sonic transponder or the like to position the intake of the skimming system. This system was not designed to operate in a well casing and takes in water and oil during its operation. Such a device is disclosed in U.S. Pat. No. 4,154,678.

None of the oil recovery systems described above disclose apparatus which uses the principle of specific gravity to ensure that only oil enters the apparatus for recovery purposes. A device using such principle would simplify and lower the cost of an oil recovery process. Moreover, none of the oil recovery systems described above discloses apparatus which can be used in a 2-inch or 4-inch inside diameter well casing. Such an apparatus would be easier to operate and be less expensive to install than conventional systems. None of the systems described above can operate without an electrical control or sensing unit which governs the positioning of the system itself or the fluid removal thereby.

The proposed system of the prsent invention does not require electrical power to operate. Without electrical controls, the danger of fire and explosion is reduced and the cost of the equipment is lowered. None of the aforementioned systems uses piping to hold an oil recovery unit vertically in the well and centered in the well casing as does the present invention. The present invention further uses those piping supports as conduits for liquid hydrocarbons, water and air.

Because of the aforementioned deficiencies of conventional underground oil recovery systems, a need exists for improvements in the recovery of liquid hydrocarbons residing on ground water.

SUMMARY OF THE INVENTION

The present invention fills the aforesaid need by providing an improved apparatus for recovery of liquid hydrocarbons which have escaped from storage tanks and other facilities into the ground and reside on the top of ground water. In the invention, recovery of liquid hydrocarbons is made from one or more small (2- to 4-inch) inside diameter wells. The invention requires no electronic sensors or switches in the well; thus the probability of fire or explosion in a well due to electronic circuitry is eliminated. The invention requires no other vertical positioning device other than its own structural body and this feature reduces the complexity, cost and electrical requirements in the field of underground oil spill recovery.

In the practice of the present invention, a liquid hydrocarbon recovery unit recovers lighter-than-water, immiscible hydrocarbons, but does not take in water. Water is prevented from entering the hydrocarbon recovery units because the intake of the recovery unit is always above the water level. This is achieved by constructing the invention so that the specific gravity of the recovery unit is less than that of water, 1.0, and greater than that of the liquid hydrocarbons, 0.5 to 0.85. An example of a construction material usable in constructing the recovery unit with such a specific gravity is polypropylene which has a specific gravity of 0.91. Thus the hydrocarbon recovery unit floats in water and sinks in the liquid hydrocarbon. The design is such that this would be the case whether the recovery unit is empty, filled with liquid hydrocarbons or even accidentally filled with water.

The hydrocarbon recovery unit of the present invention is designed to float at the liquid hydrocarbon/water interface in the well casing. When no oil or only a minimal amount of oil is present, the top of the recovery unit is above all fluid in the well due to its buoyancy. The liquid hydrocarbon inlet is located on the top surface of the recovery unit. This inlet is the only fluid entrance to the recovery unit for the liquid hydrocarbons. As the liquid hydrocarbon level rises, the inlet is gradually submerged in the liquid hydrocarbon because the recovery unit is heavier than the liquid hydrocarbon. The liquid hydrocarbon can then enter the inlet of the recovery unit.

The liquid hydrocarbons are removed from the recovery unit via a tube. This tube can be solidly attached to the recovery unit and thus follow it as it floats and sinks or it can be fixed with respect to the well casing and slide inside the recovery unit.

A pump is used to propel the liquid hydrocarbons through the tube and remove it from the well casing. After a sufficient volume of liquid hydrocarbons is removed from the well, the unit will be buoyed up by the ground water beneath the reduced layer of liquid hydrocarbons. Eventually, as such buoyancy increases, the inlet of the recovery unit will once again be above the liquid hydrocarbon level. This cycle can be repeated until sufficient liquid hydrocarbons are removed such that not enough will enter the well casing to again submerge the recovery unit. In this manner the spilled liquid hydrocarbons are cleaned from where they float on ground water.

In the method of oil recovery from underground spills sometimes it is necessary to withdraw the ground water which underlies the liquid hydrocarbon pool. In so doing a "cone of depression" in the local fluid level is created. This assists in the movement of liquid hydrocarbons out of the soils and into the well casing. The present invention incorporates a ground water removal feature through the vertical stabilizing components of the system. These vertical components are sections of tubing which are also used to position the recovery unit in the well casing and to hold it in a vertical position.

BRIEF DESCRIPTION OF THE DRAWINGS

FIG. 1 SPECIFIC GRAVITY SKIMMER WITH SINGLE, CENTERED CONDUIT

Figure 1:
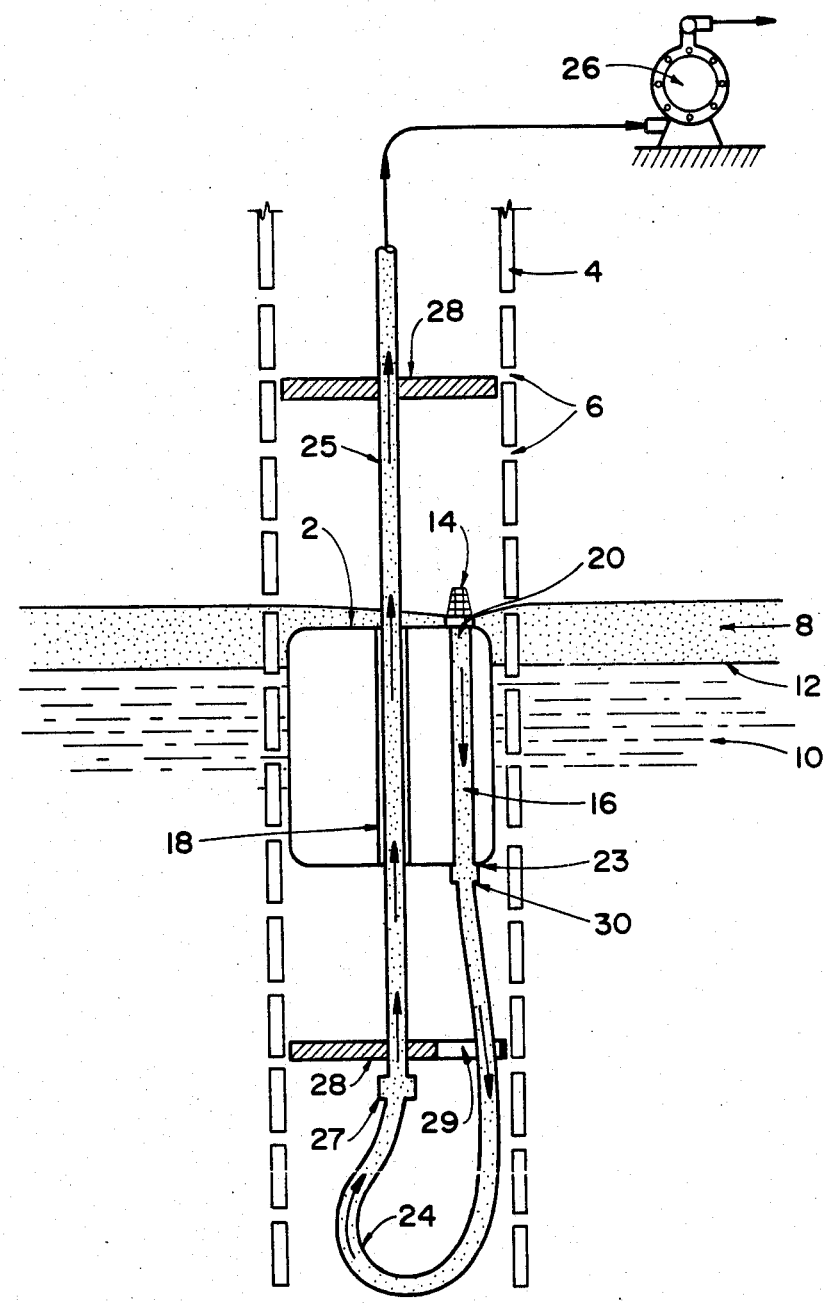
FIG. 1 is a vertical section of one embodiment of the specific gravity liquid hydrocarbon recovery device. The recovery device is being centered in the well by disks firmly attached to the conduits.

In the first embodiment of the invention, shown in FIG. 1, a liquid hydrocarbon recovery unit 2 floats inside a well casing 4 which has perforations 6 to allow liquid hydrocarbons, such as in layer 8 and ground water, such as in layer 10, to seep into the well.

As can be seen in FIG. 1 the unit 2 includes a solid-bodied, single part of cylindrical shape with one bore 16 drilled through it longitudinally, the upper, open end of bore 16, located at the uppermost extremity of the recovery unit 2, being open to act as an inlet 20 and the lower end of the bore 16, located at the lowermost extremity of the recovery unit, being open to form an outlet 23 for the liquid hydrocarbons. Another bore 18 drilled through the body longitudinally acts as a sliding fit passageway for the liquid hydrocarbon removal tube 24 to pass through as it travels up out of the well casing 4. The recovery unit 2 is constructed such that its average specific gravity is less than that of water 10 but greater than that of the liquid hydrocarbon to be recovered. An example of a material of which the recovery unit 2 can be constructed is polypropylene which floats in water but sinks in most lighter-than-water liquid hydrocarbons. The recovery unit 2 then floats with its inlet 20 above the hydrocarbon/water interface 12. The inlet 20 can have a screen 14 over it to prevent the entrance of debris into the recovery unit.

When the liquid hydrocarbon layer or pool 8 becomes sufficiently thickened by an inflow into the well casing 4 of liquid hydrocarbons, the recovery unit 2 will eventually submerge beneath the upper surface of the liquid hydrocarbon layer 8. When this occurs liquid hydrocarbons flow into the recovery unit inlet 20 through the inlet screen 14 and pass down through the vertical passageway 16 in the body of the recovery unit 2 to the flexible hydrocarbon removal tube 24. The liquid hydrocarbons then travel up through the removal tube 24 which passes through the vertical passageway 18 in the body of the recovery unit 2 and upwardly and out of the well casing 4. The liquid hydrocarbons are drawn through the removal tube 24 via a pump 26.

The flexible hydrocarbon removal tube 24 can be connected to a rigid conduit 25 which extends down through the sliding passageway 18 to a location below the recovery unit 2. This rigid conduit 25 can act as a guide which holds the recovery unit 2 centered in the well casing 4. This allows the recovery unit 2 to rise and fall free from interference of the inner walls of the well casing 4. This rigid conduit 25 can be held centered in the well casing 4 by disk spacers 28 which fit tightly to the conduit 25 and have an outside diameter greater than the recovery unit 2, but less than the inside diameter of the well casing 4. The flexible recovery tubing 24 can pass through a hole 29 in the disk spacer 28 located below the recovery unit 2 and then loop upwardly with one end attached to the rigid conduit 25 via a mechanical fitting 27 and the other end attached to the hydrocarbon outlet 23 of the recovery unit 2 via a mechanical fitting 30.

Figures 2, 2A:
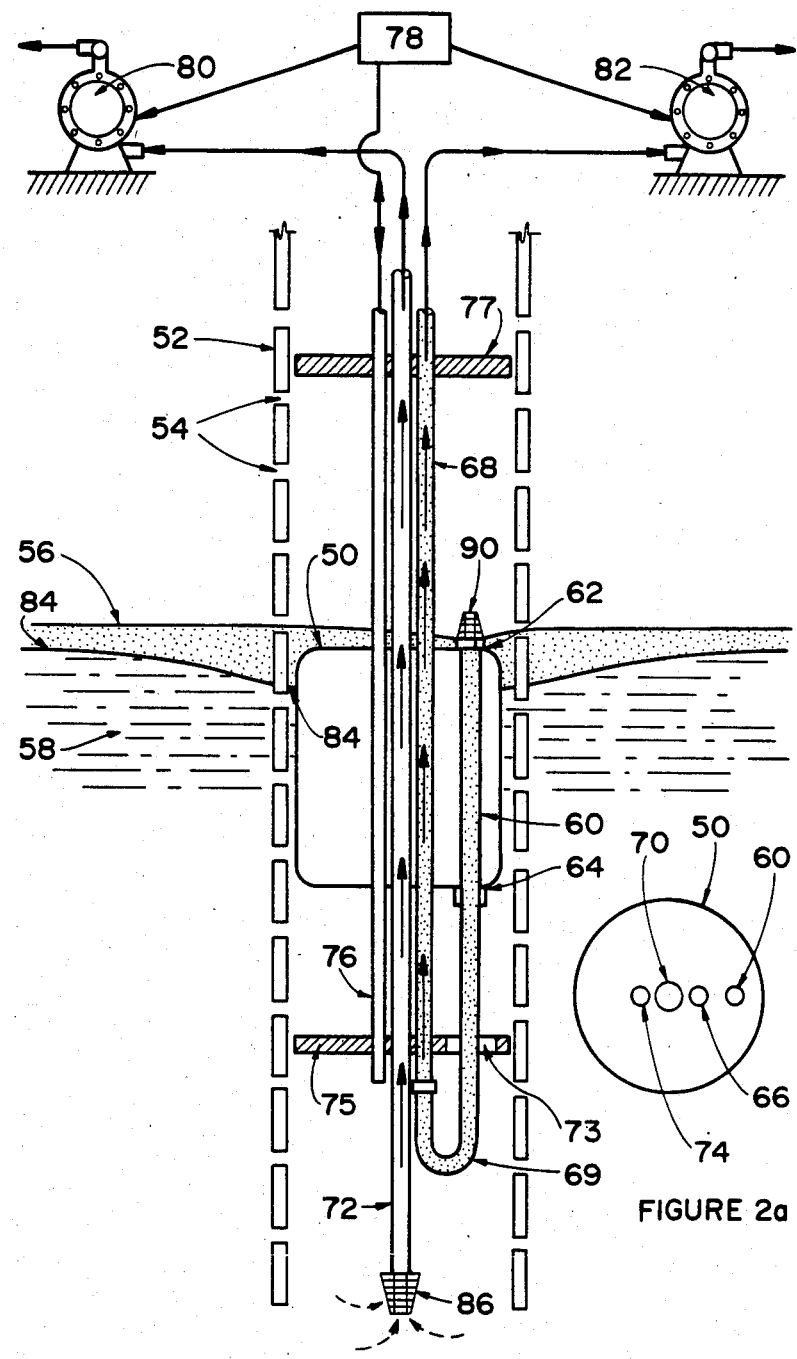
FIG. 2 is a view similar to FIG. 1 but showing a second embodiment. The recovery unit is centered in a well using disks mounted on conduits.
FIG. 2a is a schematic view of the recovery unit of FIG. 2 showing its cross section.
Figures 3, 3A:
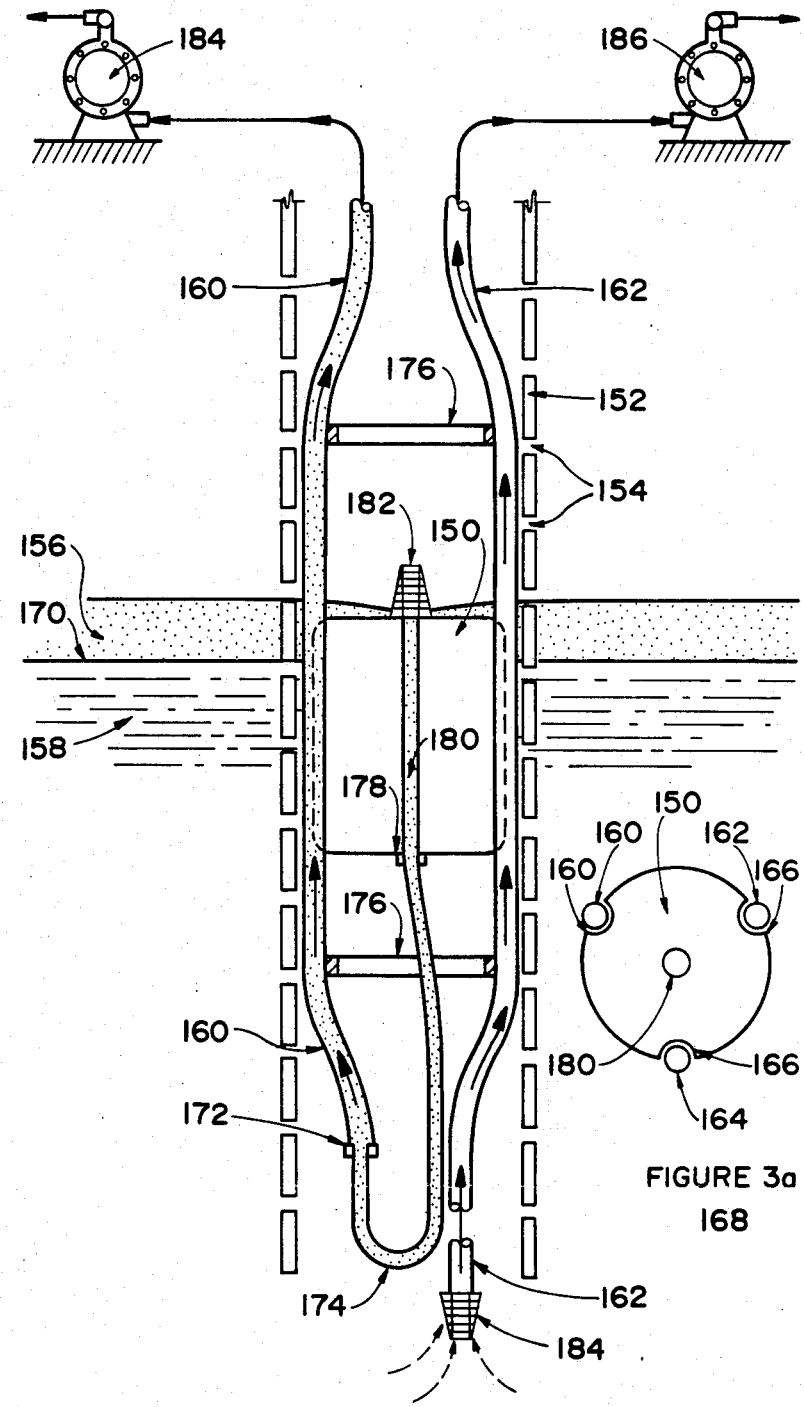
FIG. 3 is a view similar to FIGS. 1 and 2 but showing a third embodiment in which the recovery unit is held centered in a well casing by a "cage" of conduits which surround the unit.
FIG. 3a is a schematic view of the recovery unit of FIG. 3 showing its cross section.

In the second embodiment, shown in FIG. 2, the recovery unit 50 floats inside a well casing 52 which has perforations 54 to allow liquid hydrocarbons 56 and ground water 58 to seep into the inner confines of the well casing 52. As can be seen in FIG. 2 and FIG. 2a, the recovery unit 50 consists of a single piece, solid-bodied cylindrical shaped piece. This piece has an outer diameter less than the inside diameter of the well casing 52 with a number of bores drilled through the body longitudinally. One bore 60, shown in horizontal section FIG. 2a, drilled through the recovery unit 50 longitudinally has an upper end, located at the uppermost extremity of the recovery unit 50, which acts as an inlet 62 and a lower end, located at the lowermost extremity of the recovery unit 50, which acts as an outlet 64 for the liquid hydrocarbons. Another bore 66 drilled through the recovery unit 50 acts as a sliding passageway for a water removal conduit 72. Another bore 74 drilled through the recovery unit 50 acts as a sliding passageway for a pressurized air conduit 76. This air conduit 76 can be used to sense the relative, fluid level in the well casing 52. Additional bores may be drilled through the recovery unit 50 to act as sliding passageways for other conduits to be used for liquid level sensors or pressurized air conduits for driving pumps positioned below the recovery unit 50. The bores may be grouped together as to intersect with each other. In this manner the various conduits could be bundled together and passed through the recovery unit 50 as one larger, multipassage conduit. The bores may be separated even to the edges of the recovery unit 50. If this is done, the conduits can be used to form a type of long cage around the recovery unit 50 to allow it to slide up and down within the cage. This is shown in FIG. 3.

FIG. 2—SPECIFIC GRAVITY SKIMMER WITH CENTERED, GROUPED CONDUITS

In FIG. 2 is also shown a small control schematic. The control station 78 senses the air pressure in the level sensing conduit 76 and signals either the ground water draw down pump 80 or the hydrocarbon removal pump 82 or both of them to begin to pump or to stop pumping. The ground water draw down pump 80 maintains the liquid hydrocarbon/water level 84 at the desired position in the well casing 52. When the ground water draw down pump 80 is turned on, the ground water 58 is drawn into a screened inlet 86 on the water removal conduit 72. This lowers the water level 84 outside the well casing 52. In this manner a "cone of depression" in the water table is formed which draws fluids to the well casing 52.

When fuel removal pump 82 is turned on, the hydrocarbons 56, which have entered the screened inlet 90 in the recovery unit 50, are drawn through the flexible hydrocarbon recovery tube 69 and up through the rigid hydrocarbon recovery conduit 68 and out of the well casing 52. The recovery unit 50 is held away from the inner walls of the well casing 52 by a centering disk 77 attached firmly to the conduits 68,72,76 above the recovery unit 50 and a centering disk 75 firmly attached to the conduits 68,72,76 below the recovery unit 50. These centering disks 75, 77 have the same outside diameters. The dimension of the outside diameter of these centering disks 75,77 is greater than that of the outside diameter of the recovery unit 50, but less than that of the inside diameter of the well casing 52.

FIG. 3—SPECIFIC GRAVITY SKIMMER WITH CONDUIT CAGE

In the third embodiment of the system, shown in FIG. 3, the recovery unit 150 floats on the fluid in a well casing 152 which has perforations 154 to allow liquid hydrocarbons 156 and water 158 to enter through its walls. The recovery unit 150 is held vertically in the well casing 152 via at least two vertical conduits 160, 162, 164 which form a cage around the recovery unit 150. These conduits 160, 162, 164 are held in their relative position via two conduit support rings 176. These conduit support rings 176 are firmly attached to the conduits 160,162,164 so as to maintain the structural cage which surround the recovery unit 150. The conduit support rings 176 also serve as stops to prevent the recovery unit 150 from wedging itself between the conduits 160, 162, 164 where they narrow. The outer wall of the usually cylindrical recovery unit 150, with an outer diameter less than the inside diameter of the well casing 152, is routed along the longitudinal axis of the recovery unit 150. These routed slots 166 are shown in the cutaway top view FIG. 3a, which is presented to clearly illustrate the machined details of the recovery unit 150. In the side view only two conduits 160, 162 are shown for the sake of clarity. The routed slots 166 are of sufficient size to allow the recovery unit 150 to easily slide up and down as it follows the fluctuation of the liquid hydrocarbon/water interface 170 in the well casing 152. However, the routed slots 166 are not so large as they allow the recovery unit 150 to move laterally far enough in any direction so as to come in contact with the inside walls of the well casing 152. Thus the conduits 160, 162, 164 hold the recovery unit 150 centered and vertical in the well casing 152. No centering disks are required as in the other embodiments of the device. The vertical conduits 160, 162, 164 which form the cage around the recovery unit 150 and keep it centered in the well casing 152 also serve to transport fluids and air. The liquid hydrocarbon removal conduit 160 is attached at its lower end via a mechanical fitting 172 to a flexible tube 174 which loops downward and then upwards through the center of the conduit support ring 176 to the recovery unit 150. The flexible tube 174 is attached via a mechanical fitting 178 to the lower opening of a bore 180 which is drilled longitudinally through the recovery unit 150. As can be seen in FIG. 3 and FIG. 3a, the upper end of bore 180 is located at the uppermost extremity of the recovery unit 150, while the lower end of bore 180 is located at the lowermost extremity of recovery unit 150. The upper end of this longitudinally drilled hole 180 serves as the screened inlet 182 to the recovery unit 150, while the lower end of bore 180 serves as the outlet. The upper end of the hydrocarbon removal conduit 160 leads out of the well casing 152 to the hydrocarbon pump 184. The water removal conduit 162 extends down below the recovery unit 150 and has on its lower extremity a screened inlet 184 which takes in the ground water 158. The upper end of the water removal conduit 162 leads out of the well casing 152 to the water pump 186. Other conduits, such as the level sensing conduit 164 shown in the cutaway top view 168 can be used for sensing fluid levels or transport of a fluid.

As with the other embodiments, the recovery unit 150 is of such material and construction so that its specific gravity is less than water and greater than liquid hydrocarbons to be recovered. This allows the recovery unit 150 to sink in liquid hydrocarbons 156 and float in water 158. When the liquid hydrocarbon layer 156 becomes sufficiently thickened by an influx of liquid hydrocarbons into the well casing 152, the recovery unit 150 will submerge below the surface of liquid hydrocarbons 156. The liquid hydrocarbons 156 can then enter the screened inlet 182 of the recovery unit 150, pass down through the longitudinal hole 180, and enter the flexible hydrocarbon removal tube 174. The hydrocarbon pump 184 will draw the liquid hydrocarbons up, out of the well casing 152 through the hydrocarbon removal conduit 160. If water 158 is to be removed from below the pool of liquid hydrocarbons 156 the water pump 186 is turned on and water 158 is drawn into the screened inlet 182 of the water removal conduit 162 and it is pulled up out of the well through the water removal conduit 162 to the water removal pump 186.

CONCLUSIONS AND SCOPE

Thus it is seen that the present invention provides a novel, lightweight, economical, highly reliable, oil recovery device which can be easily manufactured, installed, used and removed by persons with a minmal amount of knowledge in the field of underground oil spill recovery. The present invention has the capacity to save millions of dollars in materials and labor by reducing the size of wells to be installed for underground oil spill recovery operations.

While the above description contains many specificities, the reader should not construe these limitations on the scope of the invention, but merely as exemplifications of preferred embodiments thereof. Those skilled in the art will envision many other possible variations are within its scope. Accordingly the reader is requested to determine the scope of the invention by the appended claims and their legal equivalents, and not by the examples which have been given.

What is claimed is:

1. Apparatus for recovery of liquid hydrocarbons floating on ground water comprising:
   a recovery unit having a density such that it is floatable on water and non-floatable in liquid hydrocarbons, said unit having a receptacle having an upper inlet for receiving liquid hydrocarbons, said upper inlet being located at the uppermost extremity of said unit, said receptacle also having an outlet located at the lowermost extremity of said unit, said outlet is directly coupled to said upper inlet via a passageway;

a partially flexible conduit coupled to said outlet and extending downwardly from said unit and then upwardly so as to pass through said unit and having means for coupling said conduit to a fluid receiver remote from the recovery unit for directing liquid hydrocarbons from said receptacle to a receiver; and means coupled to said recovery unit for pumping liquid hydrocarbons from said conduit to said receiver.

2. Apparatus as set forth in claim 1, further including a screen over said receptacle inlet for preventing debris from entering said receptacle.

3. Apparatus as set forth in claim 1, further including a plurality of several vertical bores through said recovery unit for accommodating a plurality of respective conduits.

4. Apparatus as set forth in claim 1, further including a plurality of parallel conduits connected to each other above and below said recovery unit, said conduits forming a cage-like structure which holds said recovery unit and can shiftably move with respect to said recovery unit.

5. Apparatus as set forth in claim 4 wherein said cage-like structure is shaped to center and guide said recovery unit in a well casing.

6. Apparatus as set forth in claim 1, wherein said conduit is the only structure extending above the recovery unit.

7. Apparatus for the recovery of liquid hydrocarbons floating on ground water comprising:

a well casing;

a cylindrically-shaped recovery unit which has a specific gravity less than that of water and greater than that of said liquid hydrocarbons;

said recovery unit being positioned in an operative position within said well casing for vertical movement with respect thereto, said recovery unit having an inlet at its uppermost extremity for receiving said liquid hydrocarbons when said recovery unit is in said operative position and an outlet at its lowermost extremity, and a conduit connecting said inlet to said outlet, whereby said liquid hydrocarbons can flow into said recovery unit through said inlet and out of said recovery unit through said outlet when said recovery unit is in said operative position, and;

means coupling said outlet of said recovery unit to a collection station above the recovery unit for directing said liquid hydrocarbons to said collection station; said means being a partially flexible conduit which is coupled with said outlet and extends downward and then loops upward, passing through said recovery unit and upwardly therefrom to a location spaced above said recovery unit; said conduit being rigid when it passes through said recovery unit and said conduit being rigidly attached to other conduits running parallel with it and positioned around the periphery of said recovery unit such that a conduit cage is formed around said recovery unit, whereby said cage centers and guides said recovery unit in said well casing.

8. Apparatus as set forth in claim 7, wherein said recovery unit is formed of polypropylene.

9. Apparatus as set forth in claim 7, further including two of the said conduits extending upwardly, out of the well casing to connect with pumps.

10. Apparatus for recovery of liquid hydrocarbons floating on ground water comprising:

a well casing;

a cylindrically shaped, solid-bodied, one-piece, recovery unit, said recovery unit having a specific gravity such that it is substantially buoyant in water but non-buoyant in liquid hydrocarbons;

said unit having a longitudinal bore extending from its uppermost extremity through its main body to its lowermost extremity, whereby said bore will provide an opening at the uppermost extremity of said unit which will serve as an inlet for said liquid hydrocarbons and an opening at the lowermost extremity of said unit which will serve as an outlet for said liquid hydrocarbons, said recovery unit being inserted in an operative position within said well casing for vertical movement therewithin, and means coupling said outlet of said recovery unit to a collection station above the recovery unit for directing liquid hydrocarbons to said collection station; said means comprising a flexible tube which is solidly attached to said outlet of said recovery unit and which extends downward from said outlet and loops upward to pass through a longitudinal bore in the body of said recovery unit.

11. Apparatus set forth in claim 10, further including three rigid hollow conduits, spaced at equal intervals around the periphery of said unit, said recovery unit being loosely situated in the center of said conduits.

12. Apparatus set forth in claim 10, wherein said recovery unit is notched on its outer periphery to form grooves in which said conduits may shiftably move.

* * * * *